US008401001B2

(12) United States Patent
Adamovsky et al.

(10) Patent No.: US 8,401,001 B2
(45) Date of Patent: Mar. 19, 2013

(54) METHOD AND APPARATUS OF CONNECTIVITY RECOVERY IN WIRELESS NETWORK

(75) Inventors: Olga Adamovsky, Jerusalem (IL); Maxim Grabarnik, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 519 days.

(21) Appl. No.: 11/727,724

(22) Filed: Mar. 28, 2007

(65) Prior Publication Data

US 2008/0240145 A1   Oct. 2, 2008

(51) Int. Cl.
*H04L 12/28* (2006.01)
*H04L 5/14* (2006.01)
*H04W 4/00* (2009.01)
*H04J 3/06* (2006.01)

(52) U.S. Cl. ........ 370/350; 370/254; 370/294; 370/338; 455/432.1

(58) Field of Classification Search .................... 370/350
See application file for complete search history.

(56) References Cited

U.S. PATENT DOCUMENTS

| 6,332,077 | B1 * | 12/2001 | Wu et al. ..................... 455/432.1 |
| 6,842,460 | B1 * | 1/2005 | Olkkonen et al. ............. 370/465 |
| 2002/0159401 | A1 * | 10/2002 | Boger ........................... 370/294 |
| 2003/0124979 | A1 | 7/2003 | Tanada et al. |
| 2004/0114538 | A1 * | 6/2004 | Bouet ............................ 370/254 |
| 2004/0223515 | A1 * | 11/2004 | Rygielski et al. ............. 370/503 |
| 2005/0033816 | A1 | 2/2005 | Yamaguchi et al. |
| 2005/0221897 | A1 | 10/2005 | Oe |
| 2005/0262216 | A1 * | 11/2005 | Kashiwabara et al. ....... 709/208 |
| 2006/0106963 | A1 | 5/2006 | Sasaki et al. |

FOREIGN PATENT DOCUMENTS

| EP | 1 657 854 | 5/2006 |
| EP | 1 701 479 | 9/2006 |
| JP | 2006-246357 | 9/2006 |
| WO | 99/14897 A2 | 3/1999 |

OTHER PUBLICATIONS

U.S. Appl. No. 11/594,403, filed Nov. 8, 2006, Daniels, Melanie et al.
Mallet A. et al. "Multi-Port Amplifier Operation for Ka-band Space Telecommunication Applications" 2006, MTT Conference for a Space Application, p. 1518-1521.
Alonso, J. et al., "A noval MAC protocol for dynamic ad hoc wireless networks with dynamic self-configurable master-slave architecture", Personal, Indoor and Mobile Radio Communications, 2004, PIMRC 2004, 15$^{th}$ IEEE International Symposium on Publication Date: Sep. 5-8, 2004, vol. 4, on pp. 2392-2396.

(Continued)

*Primary Examiner* — Charles Appiah
*Assistant Examiner* — Natasha Cosme
(74) *Attorney, Agent, or Firm* — Shichrur & Co.

(57) ABSTRACT

A wireless communication device and a method of re-establishing a connection with a WPAN master device is presented. The method includes detecting that a first master station of a WPAN session which includes the first master device and one or more stations becomes unavailable, activating a master station application to become a second master station and sending one beacon to notify the stations of the session about the second master station connectivity parameters.

17 Claims, 3 Drawing Sheets

OTHER PUBLICATIONS

Ten-Hwang Lai, "Efficient and scalable IEEE 802.11 Ad-Hoc-Mode Timing Synchronization Function", Advanced Information Networking and Applications, 2003, AINA 2003, 17th International Conference on Mar. 27-29, 2003 pp. 318-323.

Khan, J.Y. et al., "Bluetooth-based wireless personal area network for multimedia communication", Electronic Design, Test and Applications, 2002, Proceedings, The First IEEE International Workshop on Publication Date: 2002 on pp. 47-51.

International Search Report of Application No. PCT/US2008/058153 mailed on Aug. 22, 2008.

Office Action for Chinese Patent Application No. 200880010399.4, mailed on Sep. 21, 2011.

Office Action for Japanese Patent Application No. 2009-552936 Mailed Dec. 9, 2011.

Office Action received for Russian Patent Application No. 2009134233, mailed on Oct. 13, 2010, 7 pages of Office Action and 5 pages of English translation.

Office Action received for Chinese Patent Application No. 200880010399.4, mailed on Apr. 23, 2012, 6 pages of office action and 7 pages of English translation.

Extended Search Report for EP 08799739.1 mailed on Jan. 17, 2013, 7 pages.

* cited by examiner

METHOD AND APPARATUS OF CONNECTIVITY RECOVERY IN WIRELESS NETWORK

BACKGROUND OF THE INVENTION

A personal area network (PAN) is a computer network used for communication among computer devices (for example, telephones and personal digital assistants) close to one person. The devices may or may not belong to the person in question. The reach of a PAN may be a few meters. PANs may be used for communication among the personal devices themselves (intrapersonal communication), or for connecting to a higher level network and the Internet (an uplink). Personal area networks may be wired with computer buses such as universal serial bus (USB) and FireWire. A wireless personal area network (WPAN) may use wireless network technologies such as, for example IrDA, Bluetooth and wireless technologies that define in IEEE 802.11 standard, 1999.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be under stood by reference to the following detailed description when read with the accompanied drawings in which:

Figure 1:
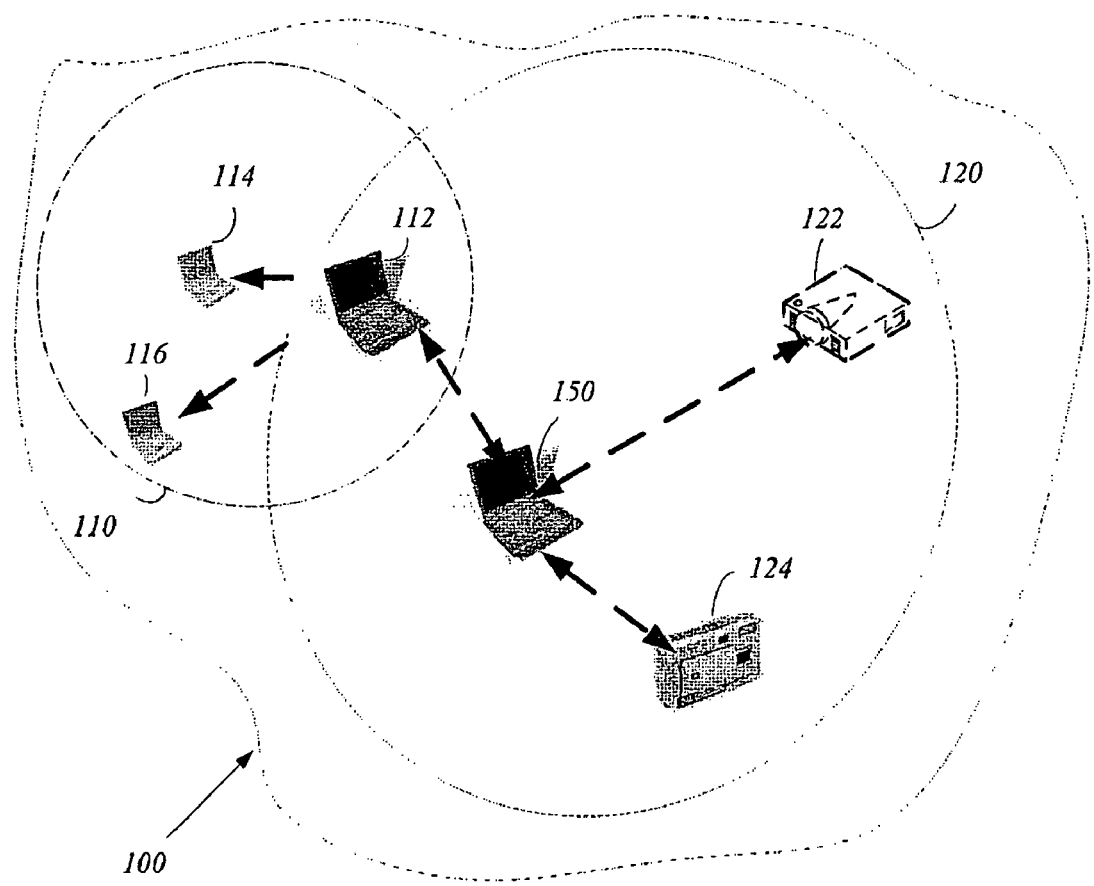
FIG. 1 is a schematic illustration of a wireless communication network according to exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, or transmission devices.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, two-way radio stations, digital system stations, analog system stations, cellular radiotelephone stations, and the like.

Types of WLAN stations intended to be within the scope of the present invention include, although are not limited to, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Turning first to FIG. 1, a schematic illustration of a communication network 100 according to exemplary embodiments of the present invention is shown. Although the scope of the present invention is not limited in this respect, wireless communication network 100 may be WLAN and/or WPAN or the like.

According to this exemplary embodiment of the invention, wireless communication network 100 includes the WPAN. The WPAN may be defined by IEEE 802.15-2002 standard, and includes an association 110, association 120 and a WPAN Master device 150. Association 110 may include stations 112, 114 and 116 Association 120 may include WPAN Master 150 and stations 112, 122 and 124.

Although the scope of the invention is not limited in this respect, a station of the WPAN may include, but not limited to, a projector, a laptop computer, a printer, a cell phone, a handheld device, an access point of WLAN or the like. For example, stations 112, 114 and 116 are laptop computer and may include a WPAN master capabilities and/or WLAN client and/or WPAN client capabilities. Station 122 may be a projector and station 124 may be a voice recorder. According to this example, stations 122 and 124 may not include WPAN master capabilities.

According to exemplary embodiments of the invention, WPAN Master device 150 may also includes WLAN client capabilities and may operate as WLAN station, if desired.

According to an exemplary embodiment of the present invention, a group of people that want to share WPAN devices and materials during a meeting may create WPAN session. WPAN Master device 150 may be selected to host a communication WPAN sessions. For example, WPAN session may create between WPAN devices 112, 122, 124 and PAN master device 150, although the scope of the present invention is not limited to this example.

According to embodiments of the present invention, the WPAN session may be a sub network of the WLAN 100.

WPAN master station 150 may advertise his WPAN capabilities by sending beacons that include WPAN capabilities information element (IE). According to embodiments of the present invention the WPAN capabilities IE may include a service set identifier (SSID) and session ID. The pair <SSID, session ID> may uniquely identify the WPAN session within WLAN 100, if desired. For example, the session ID may include the PAN master device system clock value on WPAN session creation (e.g., WPAN master device 150 and stations 112, 122, 124).

During an exemplary WPAN session that includes WPAN master device 150 and stations 112, 122 and 124, WPAN master device 150 (e.g., a laptop computer) may leave the WPAN session. Station 112 that includes WPAN master capabilities may detect that WPAN master device 150 became unavailable and becomes a new WPAN master device. Stations 114, 116, 122 and 124 may establish a connection with station 112 as the new WPAN master device and create a new WPAN session. The new WPAN session may be defined by the SSID of WLAN 100 and the session ID, which includes value of the system clock of station 112 at the time of the WPAN session creation, if desired.

The new WPAN Master device (e.g., station 112) may activate a WPAN master station application to become the new WPAN master station and send one or more beacons to notify the one or more stations (e.g., stations 114, 116, 122 and/of 124) of the one or more sessions on the new WPAN master station connectivity parameters, if desired.

Figure 2:
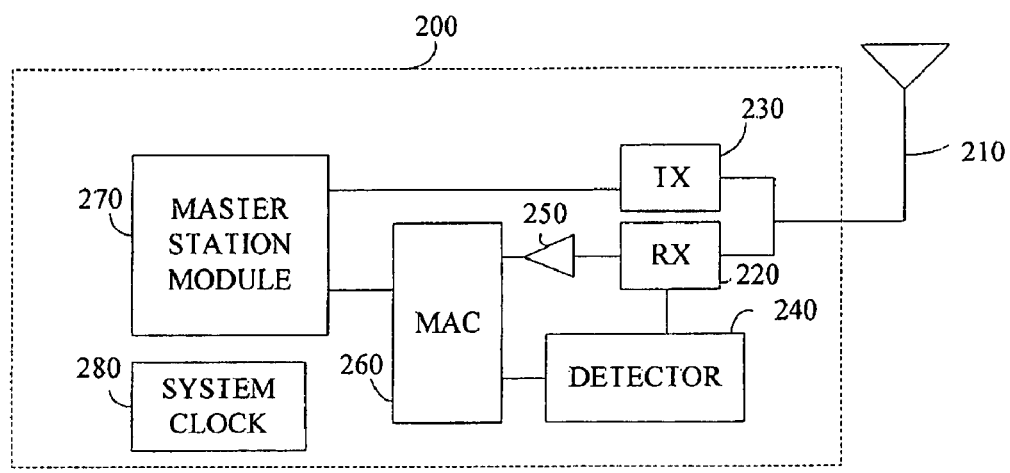
FIG. 2 is a schematic illustration of a block diagram of a wireless communication device according to some exemplary embodiment of the present.

Turning to FIG. 2, a schematic illustration of a block diagram of a wireless communication device 200 according to some exemplary embodiment of the present is shown. Although the scope of the present invention is not limited to this exemplary embodiment of the invention, wireless communication device 200 may able to operate as a WLAN client and/or as a WPAN master device.

According to embodiments of the present invention, wireless communication 200 may include an antenna 210, a receiver (RX) 220, a transmitter (TX) 230, a detector 240, a comparator 250, a controller 260, a master station module 270 and a system clock 280.

According to some embodiments of the present invention, antenna 210 may include a dipole antenna, an internal antenna, a Yagi antenna, a monopole antenna, an antenna array or the like. Antenna 210 may receive signals from one or more stations of a WLAN and/or WPAN association(s). RX 220 may demodulate the received signals and detector 240 may detect that a WPAN master station of the association becomes unavailable. For example, if WPAN master device 150 becomes unavailable because the WPAN master device left the association, the WPAN master device is in a standby mode and does not transmit beacon or receive signals or the like. Furthermore, detector 240 may detect that other master stations operate on the association and may send a detect signal to controller 260, for example, which may include a medium access controller (MAC), if desired.

According to one embodiment of the invention, if no other master devices have been detected, controller 240 may send a signal to master station module 270 to activate a master station application. The activation of the master station application may cause wireless communication device 200 to become a master station. Furthermore, master station module 270 may activate TX 230 to send one or mole beacons to notify the one or more stations of the association on connectivity parameters of the master station. The connectivity parameters may include the SSID and the session ID. The session ID may include a value of system clock 280 and the time of WPAN session creation, if desired.

According to some embodiments of the invention, RX 220 may receive a connection request signal from the one or more stations of the association in older to reestablish a connection with the one or more stations of the association. For example, RX 220 may receive timing synchronization function (TSF) values from the others master stations (e.g., station 112). Comparator 250 may compare the TSF values of at least one other master station with an internal TSF value and send the comparison result to controller 260. Controller 260 may activate or deactivate master station module 270 according to the comparison result. For example, controller 260 may permit one of the other stations to become the master station. Controller 260 may annex one or more associated stations to the new master station, if desired.

According to one embodiment of the invention, controller 260 may annex the one or more associated stations by reporting to the new master station the associated stations, preventing from the unassociated stations to join the association and disconnecting the one or more associated stations from the current master station, becoming a WPAN client of the new master station by establishing a connection with the new master station as the client.

According to other exemplary embodiments of the invention, controller 260 may annex the one or more associated stations by informing the one or more associated stations about the new master device and triggering the one or more associated stations to roam to the new master device, if desired.

Figure 3:
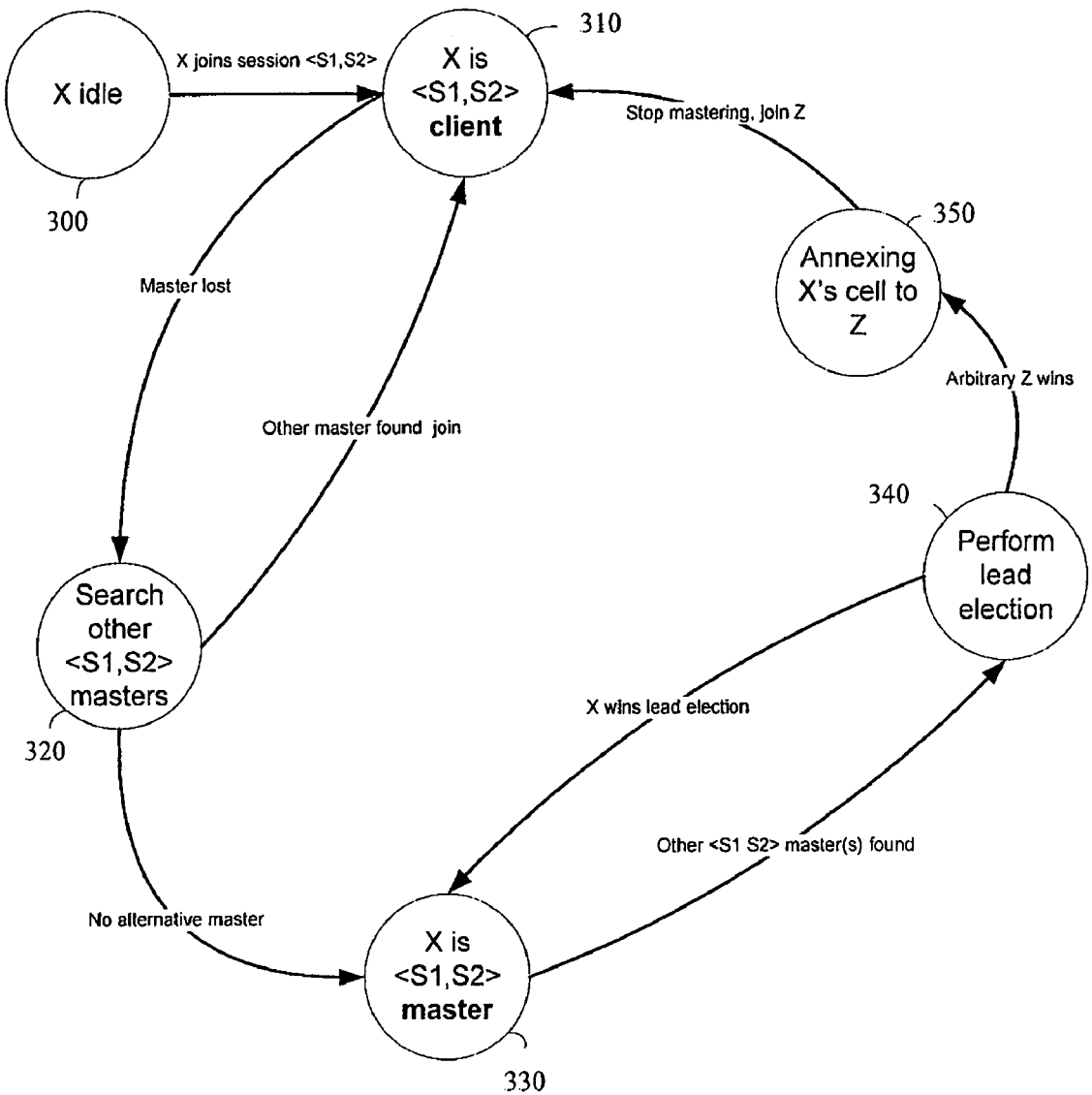
FIG. 3 is a schematic illustration of a state machine diagram of a recovery scheme of connection maintenance of WPAN in a case of a WPAN master device unsolicited unavailability, and according to exemplary embodiments of the invention of the present invention.

Turning to FIG. 3, a schematic illustration of a state machine diagram of a recovery scheme of connection maintenance of WPAN in a case of WPAN master device unsolicited unavailability according to exemplary embodiments of the invention of the present invention is shown.

The scope of the present invention is not limited to this recovery scheme of WPAN session, which define by the pair <S1, S2> wherein S1 is the SSID and S2 is the session ID. According to this exemplary scheme, client X (e.g., station 112) may join the WPAN session <S1, S2> (state 300). Client X may become WPAN session client (state 310). For example, WPAN session may include WPAN master device 150 and stations 114, 116, 122 and 124.

According to this exemplary scheme, WPAN master device is denoted as Z. The master device Z may leave the session. Client X may detect that the master device Z became unavailable and may search for other WPAN master devices in the WPAN session <S1, S2> (state 320). If client X finds other WPAN master devices, client X may joint the WPAN session <S1, S2> as a client (state 310). If client X does not find alternative WPAN master device, client X may become the new WPAN master device of WPAN session <S1, S2> (state 330).

According to some embodiments of the invention, the new WPAN master device (e.g., client X) may start to send beacons applicable to WPAN session <S1, S2> The new WPAN master device may start its timing synchronization function (TSF) values from 0. Alternatively, client X may become the new WPAN master on the same channel of the previous WPAN master device.

Although the scope of the present invention is not limited in this respect, client X at state 330 may detect other masters of WPAN session <S1, S2> Client X may perform a lead election algorithm to decide whether it should remain the new WPAN master, or should join another master as a client (state 340). For example, a lead election algorithm may include analyzing the TSF values of the other WPAN master devices and electing the WPAN master with the biggest TSF to lead the WPAN session, if desired. If other WPAN master device is elected to lead the WPAN session, client X may annex and merge with a WPAN cell of the elected WPAN master device Z.

Figure 4:
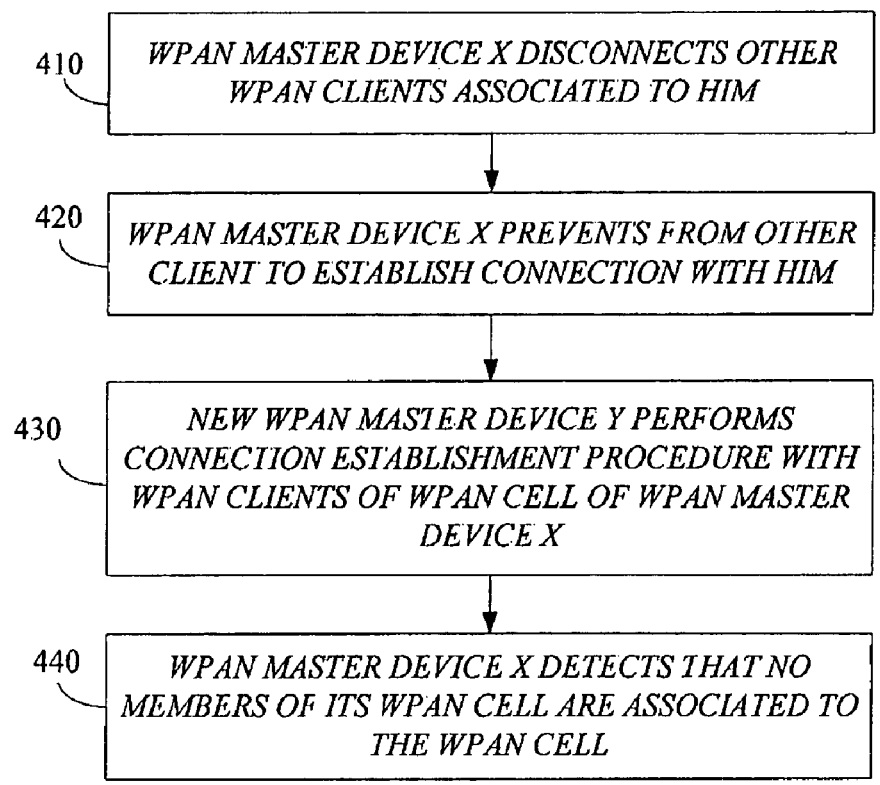
FIG. 4 is a flow chart of an annexing method according to exemplary embodiments of the invention.

Turning to FIG. 4, a flow chart of an annexing method 400 according to exemplary embodiments of the invention is shown. Although the scope of the present invention is not limited in this respect, annexing may be executed by a WPAN client that became WPAN master device X (e.g., station 112) and let another WPAN master device Y (e.g., station 116) to take the lead. The WPAN master X may establish a WPAN cell (also may be referred as association) with other WPAN stations (e.g., stations 122 and 124).

According to one exemplary embodiment of the invention, the WPAN master X (e.g., station 112) may inform clients of the WPAN cell (e.g., stations 122 and 124) about the new WPAN master device (e.g., WPAN master Y), for example station 116. For example, the WPAN master X may send to the new WPAN master device a list of clients and their capabilities using wireless domain services (WDS) traffic, if desired. According to another exemplary embodiment, the WPAN master X may trigger the new WPAN master device to query the WPAN client about the clients that are associated with it.

According to some exemplary embodiments of the invention, the WPAN master device X may disconnect associated WPAN clients (text box 410). The WPAN master X may prevent other WPAN clients (e.g., client 114) from establishing a connection with him (text box 420). The new WPAN master device Y (e.g., station 116) may perform a connection establishment procedure with the WPAN stations of the WPAN cell (text box 430). The WPAN master device X may detect that the stations of the WPAN cell are no longer connected to him (text box 440), although the scope of the present invention is not limited in this respect.

Figure 5:
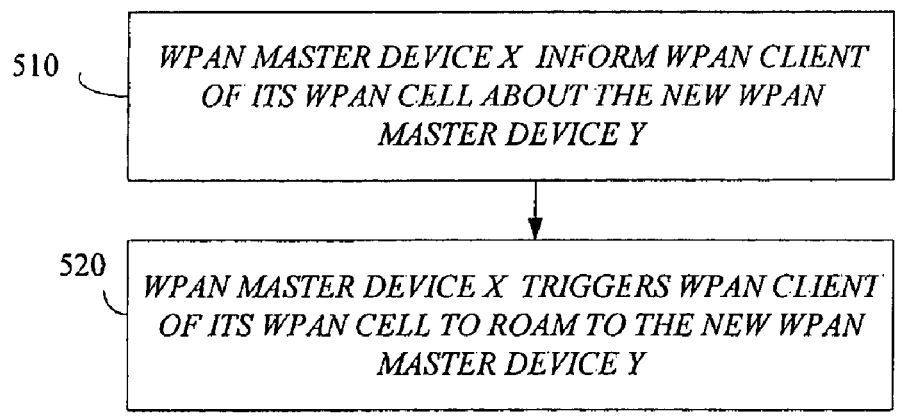
FIG. 5 is a flow chart of an annexing method according to another exemplary embodiment of the invention.

Turning to FIG. 5, a flow chart of an annexing method 500 according to another exemplary embodiment of the invention is shown. Although the scope of the present invention is not limited in this respect, a WPAN client (e.g., station 112) may inform WPAN clients of a WPAN cell (e.g., stations 122, 124) about the new WPAN master device (e.g., station 116), as is shown in text box 510. According to this embodiment of the present invention, the WPAN client may trigger WPAN clients of its WPAN cell (e.g., station 122, 124) to roam to the new WPAN master device (text box 520) and to roam to the new WPAN master device (e.g., station 116), if desired.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method of re-establishing a session of a wireless personal area network (WPAN) by a wireless communication device of a wireless local area network (WLAN) comprising:
   detecting that a master station of an association becomes unavailable, wherein the association includes at least one master station and one or more stations;
   detecting that one or more other master stations operate on the association;
   receiving timing synchronization function (TSF) values from each one of the one or more other master stations;
   comparing the TSF values of each of the one or more other master stations with an internal TSF value; and
   deciding whether or not to become a new master station according to the comparison result and if it is decided to become the new master station, becoming the new master station by activating a master station application;
   sending one or more beacons that include a WPAN capabilities information element (IE) to notify the one or more stations of the association about the new master station connectivity parameters wherein the WPAN capabilities information element (IE) includes a service set identifier (SSID) and a session ID; and
   creating a WPAN session with the one or more stations of the association.

2. The method of claim 1, further comprising:
   receiving a connection request signal from the one or more stations of the association in order to reestablish a connection with the one or more stations of the association.

3. The method of claim 1, wherein detecting comprises:
   becoming the new master station if no other master station is operating on the association.

4. The method of claim 1, wherein deciding comprises:
   deciding to permit one of the one or more other stations to become a master station of the association; and
   annexing one or more associated stations to the master station.

5. The method of claim 4, wherein annexing comprises:
   reporting to the master station the associated stations;
   preventing an unassociated station from joining the association;
   becoming a client by disconnecting from the association; and
   establishing a connection with the master station as the client.

6. The method of claim 4, wherein annexing comprises:
   informing the one or more associated stations on the master station; and
   triggering the one or more associated stations to roam to the master station.

7. A wireless communication device comprising:
   a detector to detect that a master station of an association becomes unavailable and to detect that at least one or more other master stations operate on the association, wherein the association includes at least one master station and one or more stations;
   a receiver to receive timing synchronization function (TSF) values from the other master stations;
   a comparator to compare the TSF values of each of the one or more other master stations with an internal TSF value;
   a controller to activate a master station module to make the device a new master station according to the comparison result; and
   a transmitter to, if the device becomes the new master station, send one or more beacons that include a WPAN capabilities information element (IE) to notify the one or more stations of the association about the second master station connectivity parameters wherein the WPAN capabilities information element (1E) includes a service set identifier (SSID) and a session ID in order to create a WPAN session with the one or more stations of the association.

8. The wireless communication device of claim 7 wherein the receiver is able to receive a connection request signal from the one or more stations of the association in order to reestablish a connection with the one or more stations of the association.

9. The wireless communication device of claim 7 wherein the controller permits one of the other stations to become a master station of the association and annexes one or more associated stations to the master station.

10. The wireless communication device of claim 9 wherein, while annexing, the controller is able to:
- report to the master station the associated stations;
- prevent an unassociated station from joining the association;
- become a client of the association by disconnecting from the association; and
- establishing a connection with the master station as the client.

11. The wireless communication device of claim 9, wherein while annexing the controller is able to:
- inform the one or more associated stations on the master station; and
- to trigger the one or more associated stations to roam to the master station.

12. The wireless communication device of claim 7, wherein the controller includes a medium access controller.

13. A wireless communication system comprising:
- a wireless communication device of a wireless local area network (WLAN) able to act as a master station and as a client within association of a personal area network (WPAN), the wireless communication device comprising:
  - a detector to detect that a master station of an association becomes unavailable and to detect that at least one or more other master stations operate on the association, wherein the association includes at least one master station and one or more stations;
  - a receiver to receive timing synchronization function (TSF) values from the other master stations;
  - a comparator to compare the TSF values of each of the one or more other master stations with an internal TSF value;
  - a controller to activate a master station module to make the device a new master station according to the comparison result; and
  - a transmitter to, if the device becomes the new master station, send one or more beacons that include a WPAN capabilities information element (IE) to notify the one or more stations of the association about the second master station connectivity parameters wherein the WPAN capabilities information element (IE) includes a service set identifier (SSID) and a session ID in order to create a WPAN session with the one or more stations of the association.

14. The wireless communication system of claim 13, wherein
- the receiver is able to receive a connection request signal from the one or more stations of the association in order to reestablish a connection with the one or more stations of the association.

15. The wireless communication system of claim 13 wherein the controller permits one of the other stations to become a master station of the association and annexes one or more associated stations to the master station.

16. The wireless communication system of claim 15, wherein, while annexing, the controller is able to:
- report to the master station the associated stations;
- prevent an unassociated station from joining the association;
- become a client of the association by disconnecting from the association and establishing a connection with the master station as the client.

17. The wireless communication system of claim 15 wherein while annexing the controller is able to:
- inform the one or more associated stations on the master station; and
- trigger the one or more associated stations to roam to the master station.

* * * * *

UNITED STATES PATENT AND TRADEMARK OFFICE
CERTIFICATE OF CORRECTION

| | | |
|---|---|---|
| PATENT NO. | : 8,401,001 B2 | Page 1 of 1 |
| APPLICATION NO. | : 11/727724 | |
| DATED | : March 19, 2013 | |
| INVENTOR(S) | : Olga Adamovsky et al. | |

It is certified that error appears in the above-identified patent and that said Letters Patent is hereby corrected as shown below:

On the title page, in item (56), in column 2, under "Other Publications", line 5, delete "noval" and insert -- novel --, therefor.

In the Claims:

In column 6, line 55, in claim 7, delete "(1E)" and insert -- (IE) --, therefor.

In column 6, line 64, in claim 9, delete "7" and insert -- 7, --, therefor.

In column 7, line 1, in claim 10, delete "9" and insert -- 9, --, therefor.

In column 7, line 21, in claim 13, after "a" insert -- wireless --.

In column 8, line 6, in claim 13, delete "parameters" and insert -- parameters, --, therefor.

In column 8, line 17, in claim 15, delete "13" and insert -- 13, --, therefor.

In column 8, line 29, in claim 17, delete "15" and insert -- 15, --, therefor.

Signed and Sealed this
Ninth Day of July, 2013

Teresa Stanek Rea
*Acting Director of the United States Patent and Trademark Office*